Sept. 10, 1929.　　W. F. MOTTIER　　1,727,663
GEAR SHIFTING APPARATUS
Original Filed Sept. 8, 1925　　2 Sheets-Sheet 1

Sept. 10, 1929.    W. F. MOTTIER    1,727,663
GEAR SHIFTING APPARATUS

Original Filed Sept. 8, 1925    2 Sheets-Sheet 2

Inventor
Walter F. Mottier

By Hardway Cathey

Attorneys

Patented Sept. 10, 1929.

1,727,663

UNITED STATES PATENT OFFICE.

WALTER F. MOTTIER, OF EL CAMPO, TEXAS.

GEAR-SHIFTING APPARATUS.

Application filed September 8, 1925, Serial No. 55,043. Renewed February 16, 1929.

This invention relates to new and useful improvements on a gear shifting apparatus.

One object of the invention is to provide a device of the character described through which the gears of a transmission mechanism may be easily shifted to obtain different gear ratios, and consequently different relative rates of speed between the driving and driven members of the transmission.

Another object of the invention is to provide a gear shifting apparatus of the character described, embodying a selective mechanism through which the desired gear ratio may be selected, a clutch actuating pedal, and a mechanism, operable by said pedal, through which the desired gear ratio is established.

A further feature of the invention resides in the combination of a preliminary gear selective mechanism, a clutch actuating, and gear selecting pedal, and a gear shifting mechanism arranged to be actuated by said pedal through which combination the mechanism for the desired gear ratio may be aligned, in advance, and the clutch disengaged and the selected gear combination obtained by the manipulation of the pedal.

A still further feature of the invention resides in the provision of a gear shifting apparatus which will be very accurate in the selection of the gear, or gear ratio, desired and through which the transmission mechanism may be shifted from any position to any other position without the necessity of first going to neutral, the apparatus herein described therein constituting a decided improvement over the gear shifting device disclosed in my copending application thereon, filed the 1st day of February, 1924, Serial No. 690,095.

With the above and other objects in view this invention has particular relation to certain novel features of construction, operation and arrangement of parts. an example, of which is given in this specification and illustrated in the accompanying drawings, wherein:—

Figure 1:
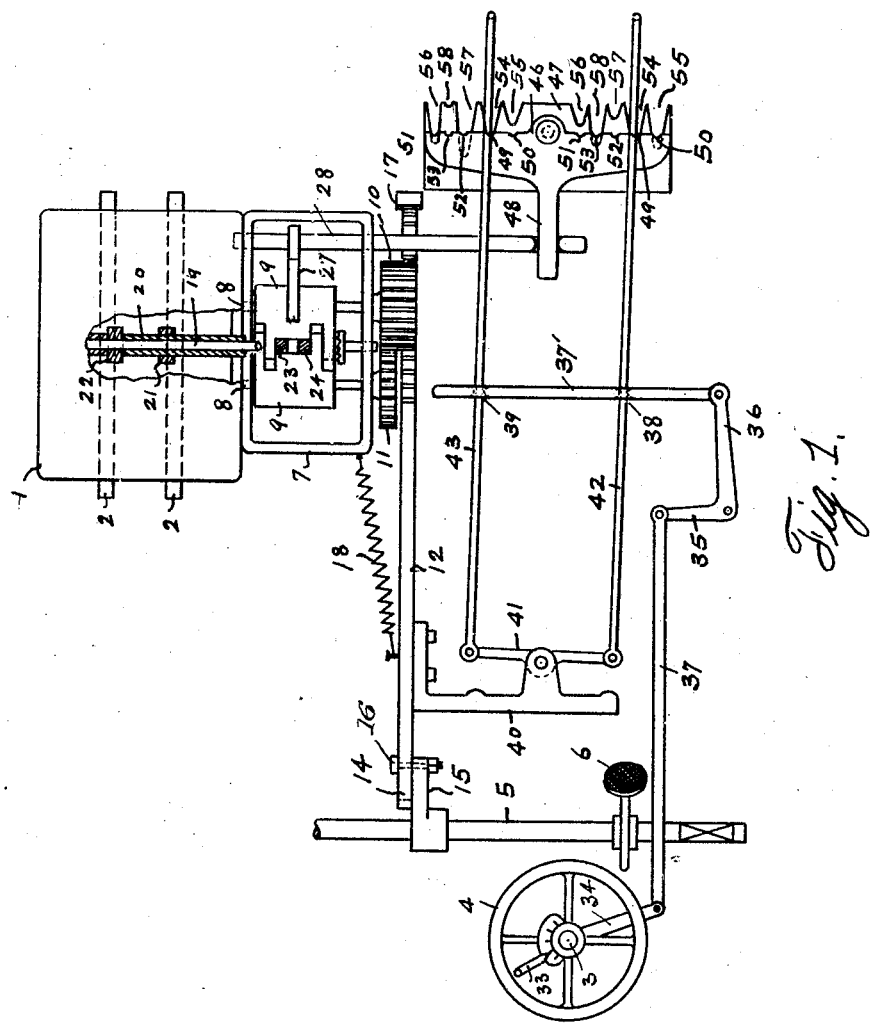
Figure 1, shows a plan view of the device, partly in section.
Figure 2:
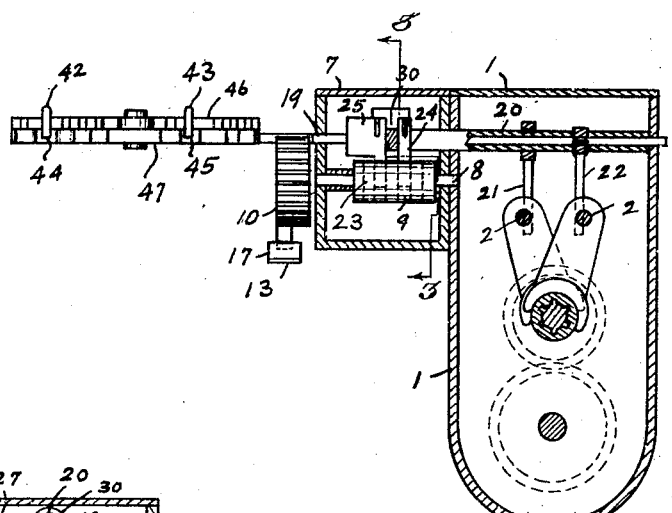
Figure 2 shows a cross sectional view of the transmission case with the gear shifting mechanism applied thereto.
Figure 3:
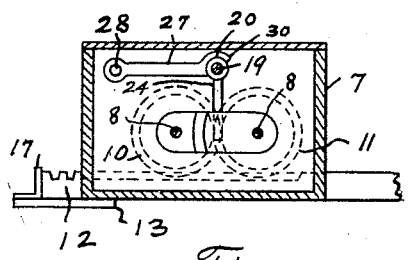
Figure 3 shows a cross sectional view taken on the line 3—3 of Figure 2.
Figure 4:
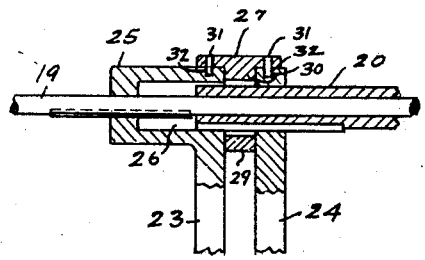
Figure 4 shows an enlarged fragmentary longitudinal view of the shift arm showing the shafts whereon said arms are mounted.
Figure 5:
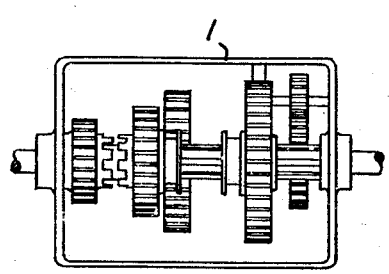
Figure 5 shows a longitudinal sectional view of the transmission mechanism.

Referring now more particularly to the drawings, wherein like numerals of reference designate similar parts in each of the figures, the numeral 1 designates the transmission case, of the ordinary motor vehicle slidably mounted in which are the gear shifting rods 2, 2.

The transmission in the case 1 is of ordinary type. This invention has to do with the shifting mechanism only, and is not concerned with the particular type of transmission with which the vehicle is equipped.

The numeral 3 designates the steering column and the numeral 4 refers to the steering wheel mounted thereon. There is a transverse clutch actuating shaft 5 which may be actuated by the foot pedal 6, fixed thereon.

Adjacent the transmission case there is a housing 7 with the transverse rocker shafts 8, 8, mounted therein. Fixed on these respective shafts are the intermeshing cam members 9, 9, of the construction and provided for a purpose, hereinafter explained. It is of course obvious that the housing 7 may be dispensed with and the mechanism therein housed in the transmission case 1 by making suitable mechanical changes; but when applied to a transmission such as is now in common use a separate housing, as 7 is desirable.

Fixed upon the outer ends of these shafts 8, 8 are the intermeshing spur gears 10, and 11, the former of which is thicker than, and extends out beyond the latter, and arranged beneath and in mesh with the extended portion of the gear 10 there is a rack member 12 which rides on a suitable bearing 13. The forward end of this rack member has an oblong slot 14 and fixed on the clutch shaft 5 there is an arm 15. The free end of this arm has a bearing pin 16 which works through the slot 14. The pin 16 normally rests at the rear end of the slot 14 and the rear end of the rack member 12 abuts against the stop 17. When the pedal 6 is depressed the clutch will first be disengaged, in the usual way, and held disengaged by any suitable mechanism, the pin 16 traveling in the slot 14; a further pressure on the pedal 6 will cause a forward movement of the rack member 12, causing a consequent rotation of the gears 10 and 11 causing the cam members 9 to open upwardly or swing around out of mesh. At the same time the pull spring 18, attached at its respective ends to the housing 7 and the rack member 12, will be placed under tension, and when the pedal 6 is released this pull spring will cause a reverse motion of the rack member 12, causing the cam members 9 to swing together and intermesh.

The numerals 19 and 20, respectively designate the shift arm shafts, the former of which telescopes through the latter. Fastened upon these respective shafts are the shift arms 21 and 22 which depend therefrom and work through suitable slots in the top of the transmission case 1 and have connection, in the conventionel manner with the gear shifting rods 2, 2, of the transmission mechanism.

Splined on, and depending from, the respective shafts 19 and 20 are the arms 23 and 24. The bearing 25, of the arm 23, is elongated and formed with a deep socket 26, designed to receive the adjacent end of the shaft 20. These arms 23 and 24 depend between the cam members 9, 9, and are actuated thereby and in turn actuate the respective shafts 19 and 20, which, in turn, actuate the shift arms 21 and 22, and thereby shift the transmission gears.

The arms 23 and 24 may be shifted lengthwise back and forth, on their respective shafts by means of a yoke 27, one end of which is fixed on the shift rod 28, and whose other end is bifurcated and its fingers 29, 30 embrace the shaft 20 between the bearings of the arms 23, 24. The finger 30 overlaps said arm bearings and has the pins 31, 31 which project into arcuate peripheral slots 32, 32 in said bearings.

On the steering wheel there is a manual shift lever 33 which is rigidly connected to a lateral arm 34. There is a suitable pivoted bell crank having arms 35 and 36. A link 37 is pivoted, at one end to the free end of the lateral arm 34, and at its other end to the free end of the arm 35. Pivoted, at one end, to the free end of the arm 36 there is a transversely movable link 37' provided with spaced bearings 38, 39.

Fastened to the rack bar 12 there is a bracket 40 and pivotally connected thereto there is an equalizing bar 41. There are the pull rods 42, 43 which are pivoted at their forward ends to the respective ends of the bar 41. These pull rods work through the respective bearings 38 and 39 and their rear ends are downwardly turned forming the depending studs 44 and 45.

There is a shift rack 46 pivoted on the stop plate 47. This rack has a forwardly extending arm 48 which works through a bearing in the adjacent end of the shift rod 28. The rear edge of the shift rack has pairs of open bearings, or seats, the seats, of each pair being located, at unequal distances from, and one on each side of the pivot on which the rack works. The seats 49, 49, may be for neutral position, the seats 50, 50 may be for low speed ahead, the seats 51, 51, may be for second speed ahead, the seats 52, 52, may be for third speed ahead and seats 53, 53 may be for reverse. The studs 44, 45, are adapted to seat in a previously selected pair of seats when the pedal 6 is manipulated forwardly. The seats of each pair are so located that the pivot point of the rack 46 will be off center, with respect to said seats, so that when the pedal 6 is pushed forwardly and the pull rods 42, and 43 are carried forwardly through the mechanism described, to seat the studs 44, 45, the shift rack will be actuated, and through the arm 48 will shift the rod 28, and thereby change the position of the arms 23, 24, with relation to the cams 9. The stop plate 47 carries pairs of stops, as 54, 54; 55, 55; 56, 56; 57, 57; and 58, 58, aligned with the neutral, low speed ahead, second speed ahead, third speed ahead, and reverse, respectively, so disposed that they will engage the studs 44, 45, when they have actuated the shift rack into the right position to obtain the desired gear ratio.

When it is desired to change the gear ratio of the transmission mechanism to obtain a desired speed, or neutral, the lever 33 is moved correspondingly, which will operate through the mechanism described to shift the rods 42, 43, and carry the studs 44, 45, opposite the proper pair of seats to effect the desired result. The pedal 6 is then depressed and this will operate, as described, to first disengage the clutch, and then to open, or carry out of mesh, the cam members 9, 9, thus releasing the arms 23, 24. Thereupon the studs 44, 45 will seat in the selected seats and will swing the shift rack 46 about its pivot until stopped by the corresponding stops of the stop plate 47. This movement of the shift rack will operate, through the mechanism described to shift the positions of the arms 23, 24 relative to the actuating cam members 9.

Upon release of the pedal 6 the spring 18 will retract the bar 12 which will actuate the gear wheels 10 and 11 to close the cam members 9 into intermeshing position, and as they are brought into this position they will actuate the arms 23, 24, to effect the desired shifting of the transmission gears through the shafts 19 and 20 and the respective shift arms 21, 22, carried thereby.

The forms of these cam members 9 are shown in Figure 1. It may be stated, however, that they are so formed that when they close about the arms 23, 24, they effect certain relative movements of said arms, and consequent partial rotations of the shafts 19, 20, said movements depending on the positions to which said arms have previously been moved or shifted, and the cams are of such formation that they will act upon the arms 23, 24 to bring about the desired combinations of movement of them to effect the various changes of the transmission gears to give the various gear connections for reverse, and first, second and third speeds ahead, as well as for neutral position of said gears.

What I claim is:—

1. In a gear shifting device shifting means in operative connection with, and adapted to move the gears to be shifted; rotatable members in operative connection with said means; means adjustable on said rotatable members but secured against rotation relative thereto and adapted to rotate the same; means for actuating said adjustable means to effect relative movement of said shifting means; means for moving said adjustable means into different positions in relation to said actuating means said moving means including a pivoted member operatively connected with said adjustable means and a stop plate to limit the range of movement of said pivoted member, manually actuated mechanism for releasing said actuating means from said adjustable means to permit the adjustment thereof relative to said actuating means said pivoted member being connected to and actuated by said manually actuated mechanism to effect said adjustment; means thereafter automatically operating said actuating means into operative engagement with said adjustable means to actuate the same and thereby shift the corresponding transmission gears.

2. In a gear shifting device, shifting means in operative connection with and adapted to move the gears to be shifted; rotatable members in operative connection with the respective shifting means; means secured on said respective rotatable members against rotation but movable lengthwise thereon; means adapted to actuate said movable means to effect relative movement of said shifting means; means for moving said movable means on said rotatable members and into different positions in relation to said actuating means; said moving means including a pivoted rack member operatively connected with said adjustable means and a stop plate associated wih said pivoted member and means under the control of the operator and operatively connected with said pivoted member for predetermining the operation of said moving means and through which said positions of said movable means may be preselected.

3. In a gear shifting device, shifting means in operative connection with, and adapted to move the gears to be shifted; shafts, one telescoping within the other, and on which the respective shifting means are mounted; shiftable members operatively connected with the respective shafts; means adapted to actuate said shiftable members to effect relative movement of said shifting means; means for moving said shiftable members into different positions relative to said actuating means, manually actuated mechanism for releasing said actuating means from said shiftable members to permit the shifting of said members; means thereafter automatically operating said actuating means into operative engagement with said shiftable members to actuate the same and thereby shift the corresponding transmission gears; and means, under the control of the operator for predetermining the operation of said moving means and through which said positions of said shiftable members may be previously selected.

4. A gear shifting device comprising gearing for establishing a plurality of driving relations, means for shifting said gears to establish any of said relations, said means comprising gear shifting members in operative connection with said gears, telescoping shafts on which the respective gear shifting members are mounted, shiftable members operatively connected with the respective shafts, means adapted to actuate said shiftable members to effect relative movement of said gear shifting members, a device, operable manually in one direction, through which said actuating means may be moved into inactive relation with said shiftable members, a yieldable member connected to said mannually operable device through which said actuating means may be moved into active relation with said shiftable members, means for moving said shiftable members into different positions in relation to said actuating means.

5. A gear shifting device comprising gearing for establishing a plurality of driving relations, means for shifting said gears to establish any of said relations, said means comprising gear shifting members in operative connection with said gears, telescoping shafts on which the respective gear shifting members are mounted, shiftable members, operatively connected with the respective shafts, means adapted to actuate said shiftable members to effect relative movement of said gear shifting members, means for moving said shiftable members into different positions in relation to said actuating means and means under the control of the operator, for predetermining the operation of said moving means and through which said positions of said shiftable members may be preselected.

6. A gear shifting device comprising gearing for establishing a plurality of driving relations, means for shifting said gears to establish any of said relations, said means comprising a clutch actuating pedal, gear shifting members in operative connection with said gears, independent shafts on which the respective gear shifting members are mounted, shiftable members operatively connected with the respective shafts, means adapted to actuate said shiftable members to effect relative movement of said gear shifting members, means for moving said shiftable members on said actuating shafts, and into different positions relative to said actuating means, means under the control of the operator for predetermining the operation of said moving means, and through which said positions of said shiftable members, relative to their actuating means may be pre-selected, operative connections between said clutch actuating pedal and said actuating means through which the operation of the clutch actuating pedal, through its cycle of movement, operates to disengage the clutch to release said actuating means from said shiftable members, and to operate said actuating means into operative relation with said shiftable members in succession.

7. A gear shifting device comprising gearing for establishing a plurality of driving relations and means for shifting said gears to establish any of said relations, said means comprising gear shifting members connected with said gears, independent shafts on which said respective shifting members are mounted, shiftable members mounted on said shafts, actuating means provided to operate said shiftable members, manually operable means operatively connected with said actuating means and through the manual operation of which the actuating means may be released from said shiftable members to permit the shifting thereof; said manually operable means being also operatively connected with said shiftable members and operable to shift said members, means for automatically operating the actuating means, thereby operating the shiftable members to shift said gears, through said gear shifting means.

8. A gear shifting device comprising gearing for establishing a plurality of driving relations, and means for shifting said gears to establish any of said relations, said means comprising gear shifting members in operative connection with the gears to be shifted, telescoping shafts operatively connected with the respective gear shifting members, members operatively connected with, but shiftable on said respective shafts, cams adapted to actuate said shiftable members to effect relative movement of said gear shifting members, a device operable manually in one direction through which said cams may be moved into inactive relation with said shiftable members, a yieldable member connected to said manually operable device and through which said cams may be actuated into active relation with said shiftable members, means for moving said shiftable members in to different positions in relation to the cams.

9. A gear shifting device comprising gearing for establishing a plurality of driving relations, and means for shifting said gears to establish any of said relations, said means comprising gear shifting members in operative connection with the gears to be shifted, telescoping shafts operatively connected with the respective gear shifting members, members operatively connected with, but shiftable on said respective shafts, cams adapted to actuate said shiftable members to effect relative movement of said gear shifting members, means for moving said shiftable members in to different positions in relation to the cams and means under the control of the operator for predetermining the operation of said moving means and through which said positions of the shiftable members may be predetermined.

10. In a gear shifting device, gear shifting means in operative connection with the gears to be shifted, shiftable members in operative connection with said respective means, means adapted to actuate said members to effect relative movement of said shifting means, means for moving said shiftable members into different positions relative to said actuating means, said moving means including a gear selective device under the control of the operator a pivotal member operatively connected with the suitable members, manually operable means adapted to be brought into operative connection with said shiftable members, through said selective device and pivotal member, and a stop member associated with the pivotal member and effective to limit the influence of said manually operable means on said shiftable members.

11. A gear shifting device comprising gearing for establishing a plurality of driving relations, shiftable members in operative connection with the gears to be shifted, means adapted to actuate said members to establish any of said relations, means adapted to move said shiftable members to effect the establishment of different gear ratios, said moving means including a selective device for selecting the desired driving relation, a pivotal member connected with the shiftable members, manually operable means adapted to be operatively connected with said shiftable members, through said selective device and pivotal member, and means associated with the pivotal member effective to limit the influence of said manually operable means on said shiftable members.

12. A gear shifting mechanism including gearing adapted to establish a plurality of driving relations, a gear selective device through which the desired driving relation may be selected, shiftable means for relatively shifting said gears, means for actuating said shiftable means, means for moving said shiftable means into different positions relative to said actuating means, said moving means including a shift rack in operative connection with said shiftable means, a manually operable member adapted to be operatively connected with said shift rack through the selective device, and a stop member disposed to limit the range of movement of the shift rack.

13. A gear shifting mechanism including gearing adapted to establish a plurality of driving relations, a gear selective device through which the desired driving relation may be selected, shiftable means for relatively shifting said gears, means for actuating said shiftable means, means for moving said shiftable means into different positions relative to said actuating means, said moving means including a shift rack in operative connection with said shiftable means, a manually operable member adapted to be operatively connected with said shift rack, through the selective device, and a stop member disposed to limit the range of movement of the shift rack and operative connections between said manually operable member and said actuating means.

14. In a device of the character described a pivotally mounted shift rack adapted to be operatively connected with a device to be shifted, manually operable means adapted to actuate said rack, selective means under the control of the operator and through which said manually operable means may be moved into different operative relations with said rack, a stop member to limit the range of movement of said rack, a plurality of pairs of seats carried by said shift rack, one pair of seats being provided for each gear positioned and a plurality of pairs of stops carried by said stop member corresponding in number and position to said seats, said manually operable means being movable by said selective means into operable relation with said respective pairs of seats.

15. In a device of the character described a pair of cooperating cam members shiftable members disposed to be actuated into different relative positions by said cam members, means for actuating said shiftable members, said means including a shift rack operatively connected with said shiftable members and a stop member disposed to limit the movement of said rack, and manually operable means adjustable into different operative relations with said rack and through which said rack may be operated to effect the actuation of said shiftable members.

16. In a device of the character described a pair of cooperating cam members, shiftable members disposed to be actuated into different relative positions by said cam members, means for actuating said shiftable members, said means including a shift rack operatively connected with said shiftable members and a stop member disposed to limit the movement of said rack, manually operable means adjustable into different operative relation with said rack, and through which said rack may be operated to effect the actuation of said shiftable members, a manually operable device through which said cam members may be manually actuated into inactive relation with said shiftable members and a yieldable member through which said cam members may be actuated into active relation with said shiftable members.

In testimony whereof I have signed my name to this specification.

WALTER F. MOTTIER.